(12) United States Patent
Lin

(10) Patent No.: US 6,676,205 B2
(45) Date of Patent: Jan. 13, 2004

(54) SUNSHADE DEVICE WITH A CURVED SCREEN

(75) Inventor: Paul Lin, Yung-Kang (TW)

(73) Assignee: Macauto Industrial Co., Ltd. (TW)

( * ) Notice: Subject to any disclaimer, the term of this patent is extended or adjusted under 35 U.S.C. 154(b) by 0 days.

(21) Appl. No.: 10/305,076

(22) Filed: Nov. 27, 2002

(65) Prior Publication Data

US 2003/0116997 A1 Jun. 26, 2003

(30) Foreign Application Priority Data

Dec. 26, 2001 (TW) ...................... 90222953 U

(51) Int. Cl.⁷ .................................................. B60J 1/20
(52) U.S. Cl. ...................................................... 296/214
(58) Field of Search .............................. 160/262, 266, 160/370, 22, 238, 352; 296/214, 97.8, 141, 143, 2.4

(56) References Cited

U.S. PATENT DOCUMENTS

| | | | | |
|---|---|---|---|---|
| 3,075,805 A | * | 1/1963 | Golde et al. | |
| 4,126,174 A | * | 11/1978 | Moriarty et al. | |
| 4,792,178 A | * | 12/1988 | Kokx | 296/98 |
| 4,872,722 A | * | 10/1989 | Farmont | 296/214 |
| 5,067,546 A | * | 11/1991 | Jeuffray et al. | |
| 6,079,474 A | * | 6/2000 | Lin | 160/370.22 |
| 6,523,770 B2 | * | 2/2003 | Peeters | 160/262 |
| 6,546,990 B2 | * | 4/2003 | Peeters | 160/370.22 |

* cited by examiner

Primary Examiner—Dennis H. Pedder
(74) Attorney, Agent, or Firm—Harness, Dickey & Pierce, P.L.C.

(57) ABSTRACT

A sunshade device includes an elongated housing, a rotary shaft journalled in the housing, and a screen wound around the rotary shaft and movable between retracted and stretched positions. An elongated screen guiding member is mounted in the housing, and has a convex outer wall surface. The intermediate section of the screen extends along and is in contact with the convex outer wall surface such that the screen is curved and has a curvature conforming to that of the convex outer wall surface of the screen guiding member when extended past the screen guiding member. A curved end strip is mounted on the distal end of the screen, and has a curvature conforming to that of the convex outer wall surface of the screen guiding member.

3 Claims, 7 Drawing Sheets

SUNSHADE DEVICE WITH A CURVED SCREEN

CROSS-REFERENCE TO RELATED APPLICATION

This application claims priority of Taiwanese Application 090222953, filed on Dec. 26, 2001.

BACKGROUND OF THE INVENTION

1. Field of the Invention

The present invention relates to a sunshade device, more particularly to one with a curved screen for blocking sunlight through a roof window in an automobile sunroof.

2. Description of the Related Art

A sunshade is commonly used in an automobile for shielding an interior of the automobile from sunlight. A sunshade device for shielding an automobile sunroof is known in the art. The sunshade device of this type is typically mounted on the interior lining of the sunroof adjacent to a sun window mounted in the sunroof, and has a screen which is stretchable along a flat horizontal plane and which is disposed immediately beneath the roof window for blocking sunlight when stretched. In recent years, it has been a trend to make and design the automobile sunroof higher and slightly curved in a left-to-right direction. The above-described sunshade device, when mounted in the automobile with the higher and curved sunroof, forms a large clearance with the interior lining of automobile sunroof, and thus has a relatively poor light-blocking effect. Moreover, since the screen extends horizontally and since the automobile sunroof is curved, the sunshade device is not satisfactory in view of aesthetic considerations.

SUMMARY OF THE INVENTION

Therefore, the main object of the present invention is to provide an automobile sunshade device with a curved screen to conform to the curvature of an automobile sunroof.

Accordingly, the sunshade device the present invention is adapted for mounting on an automobile sunroof with an interior lining. The sunshade device includes an elongated housing with longitudinally opposite end portions, a rotary shaft journalled in the housing, and a screen wound around the rotary shaft and having a connecting end secured to the rotary shaft, a distal end opposite to the connecting end and extending out of the housing, and an intermediate section between the connecting end and the distal end. The screen is movable between a retracted position in which the distal end is disposed adjacent to the housing, and a stretched position in which the distal end is moved away from the housing. An elongated screen guiding member is mounted in the housing, and has a longitudinal axis parallel to the rotary shaft, and a convex outer wall surface. The intermediate section of the screen extends along and is in contact with the convex outer wall surface of the screen guiding member such that the screen is curved and has a curvature conforming to that of the convex outer wall surface of the screen guiding member when extended past the screen guiding member. A curved end strip is mounted on the distal end of the screen, and has a curvature conforming to that of the convex outer wall surface of the screen guiding member.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
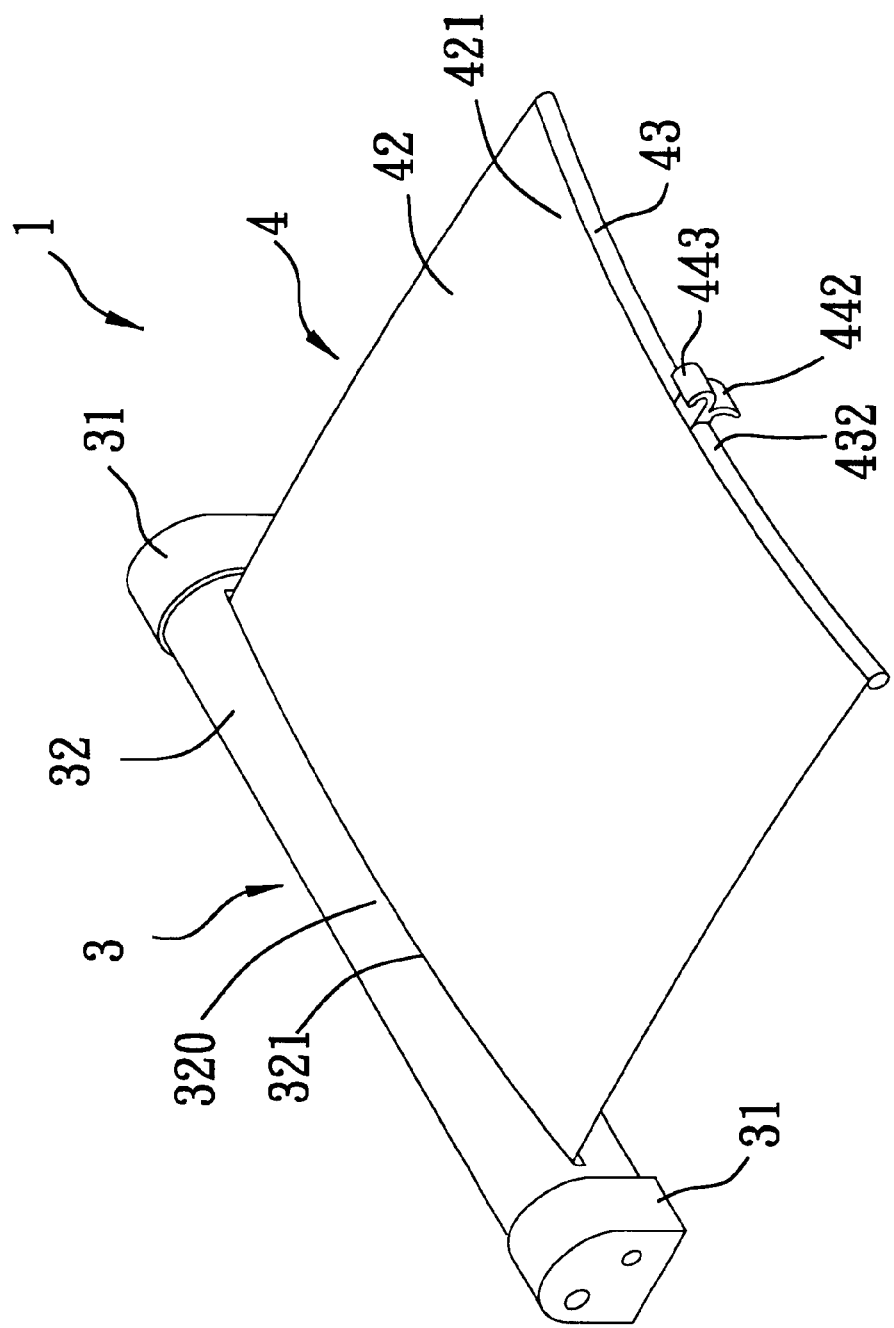
FIG. 1 is a perspective view of a first preferred embodiment of the sunshade device of the present invention.

Before the present invention is described in greater detail, it should be noted that like elements are denoted by the same reference numerals throughout the disclosure.

Figure 2:
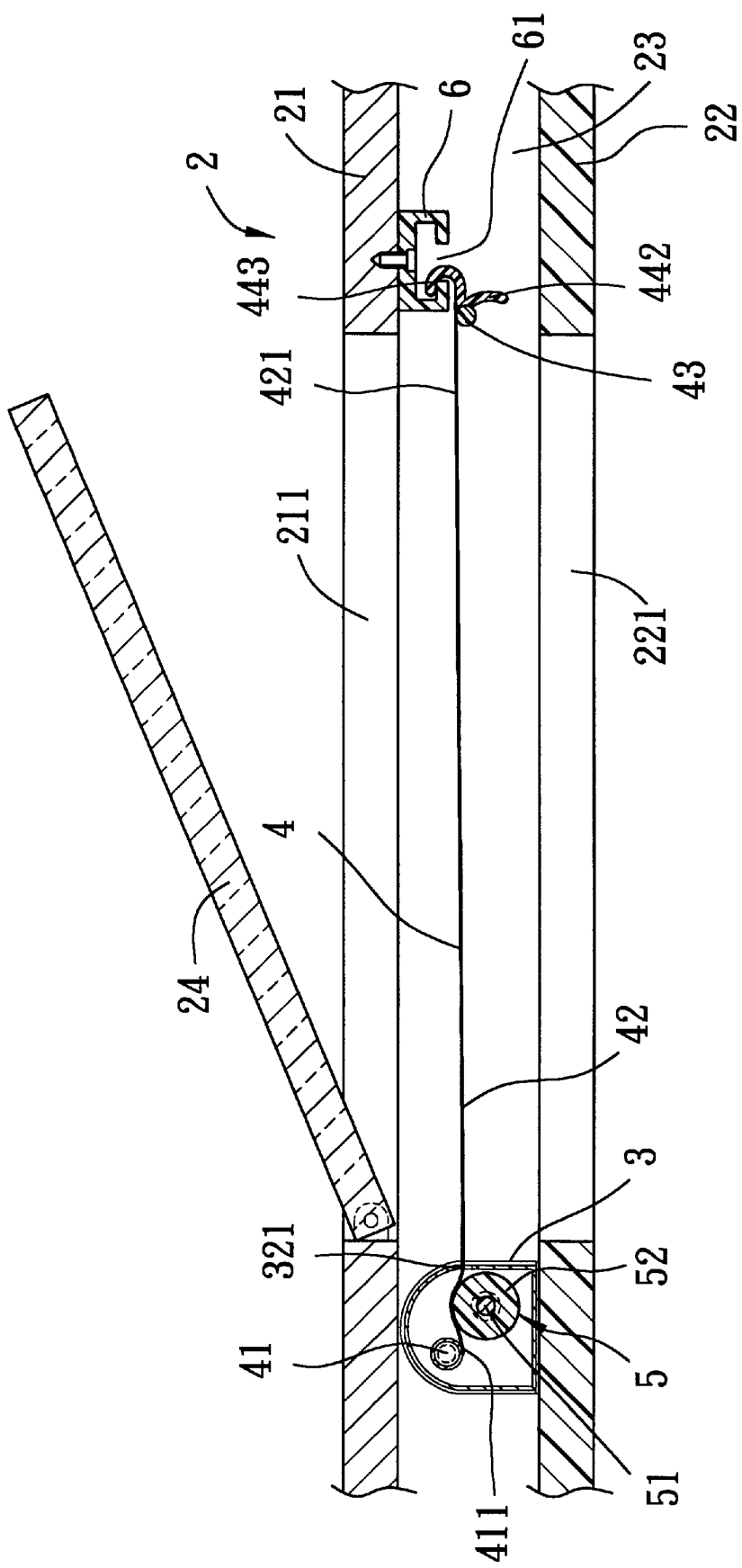
FIG. 2 is a sectional view of the first preferred embodiment when mounted on an automobile sunroof, where a screen thereof is shown to be in a stretched position.

Referring to FIGS. 1 and 2, the first preferred embodiment of the sunshade device 1 of the present invention is adapted to be installed on an interior lining 22 of an automobile sunroof for blocking sunlight passing through a window opening 211 formed in an exterior frame 21 of the automobile sunroof 2. A sun window 24 is hinged to the exterior frame 21 of the automobile sunroof 2, and is turnable to open or close the window opening 211. The interior lining 22 is also formed with a window opening 221 below and registered with the window opening 211. In the present embodiment, the sunshade device 1 is adapted to be installed in a clearance 23 formed between the interior lining 22 and the exterior frame 21 of the automobile sunroof 2, and is adapted to be mounted adjacent to the window openings 211, 221 in the automobile sunroof 2. The sunshade device 1 is shown to mainly include an elongated housing 3, a rotary shaft 41 journalled in the housing 3, a screen 4 wound around the rotary shaft 41, and a screen guiding member 5 mounted in the housing 3. The housing 3 is adapted to be concealed in the clearance 23 and is to be disposed adjacent to rear edges of the window openings 211, 221. The housing 3 has two longitudinally opposite anchoring end portions 31 adapted to be fastened to the interior lining 22 of the automobile sunroof 2, and an intermediate housing portion 32 which has a front side wall 320 facing the window openings 211, 221 and formed with a slit 321 that extends between the anchoring end portions 31. The slit 321 extends along a curved line that curves upwardly.

The rotary shaft 41 is disposed within the housing 3, and has two opposite ends mounted rotatably and respectively on the anchoring end portions 31 of the housing 3. The screen 4 is made of a flexible sheet material, and has a connecting end 411 connected securely to the rotary shaft 41, a distal end 421 opposite to the connecting end 411 and extending out of the housing 3, and an intermediate section 42 between the connecting end 411 and the distal end 421 and extending through the slit 321. Biasing means (not shown) is mounted on the rotary shaft 41 for biasing the rotary shaft 41 to rotate in a direction for winding the screen 4 in a known manner. A curved end strip 43 is mounted on the distal end 421 of the screen 4. The end strip 43 curves upwardly, and has a curvature conforming to that of the slit 321 in the housing 3. A raised middle portion 432 of the end strip 43 is provided with a hook member 443 which projects and which is bent upwardly, and a gripping stud 442 which projects and which is bent downwardly. The gripping stud 442 is formed integrally with the hook member 443. An engaging member 6 is adapted to be fastened to the automobile sunroof 2 and to be disposed within the clearance 23 adjacent to front edges of the window openings 211, 221. The engaging member 6 defines an engaging groove 61 that opens downwardly.

Figure 3:
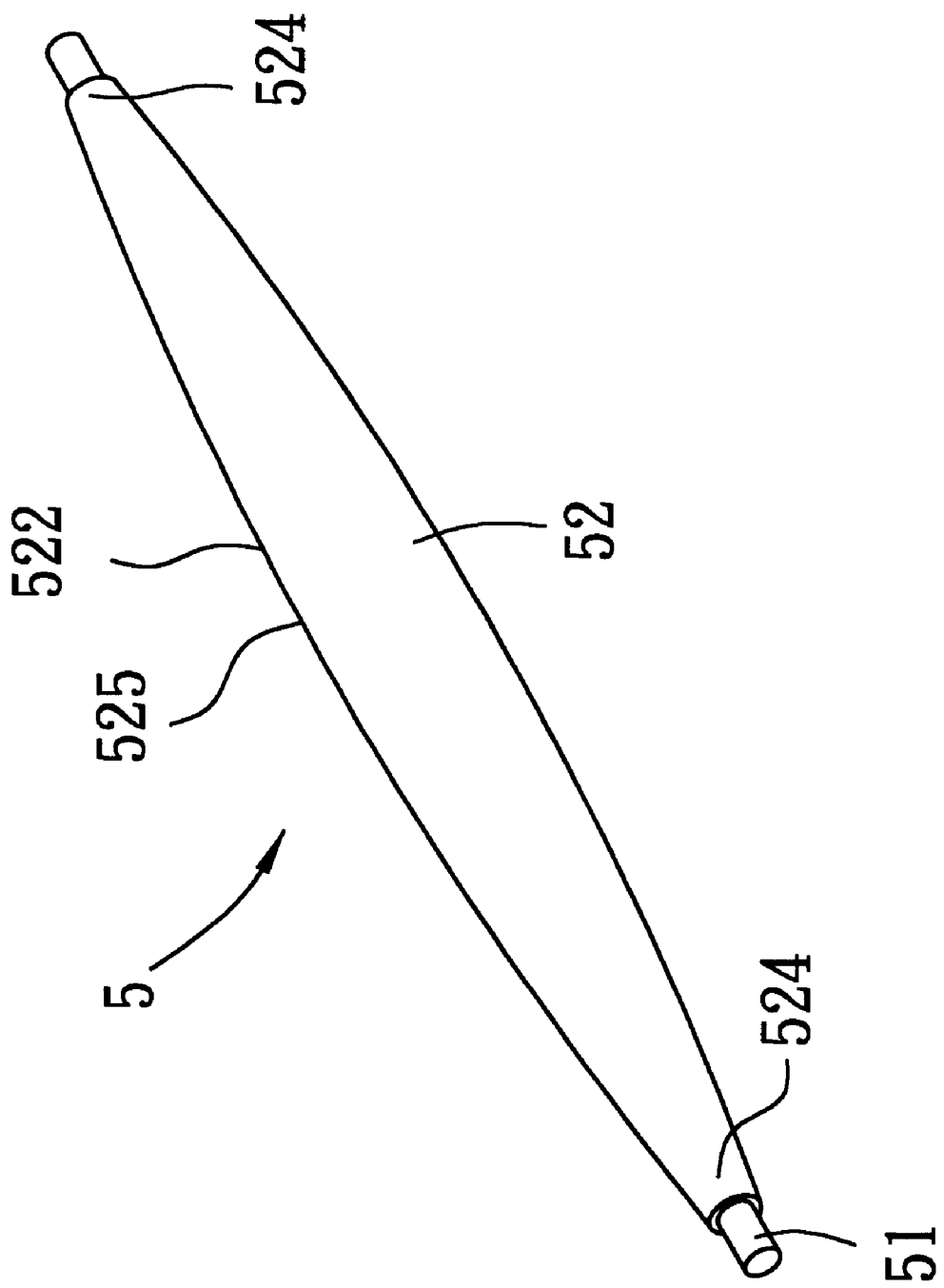
FIG. 3 is a perspective view showing a screen guiding member of the first preferred embodiment.
Figure 4:
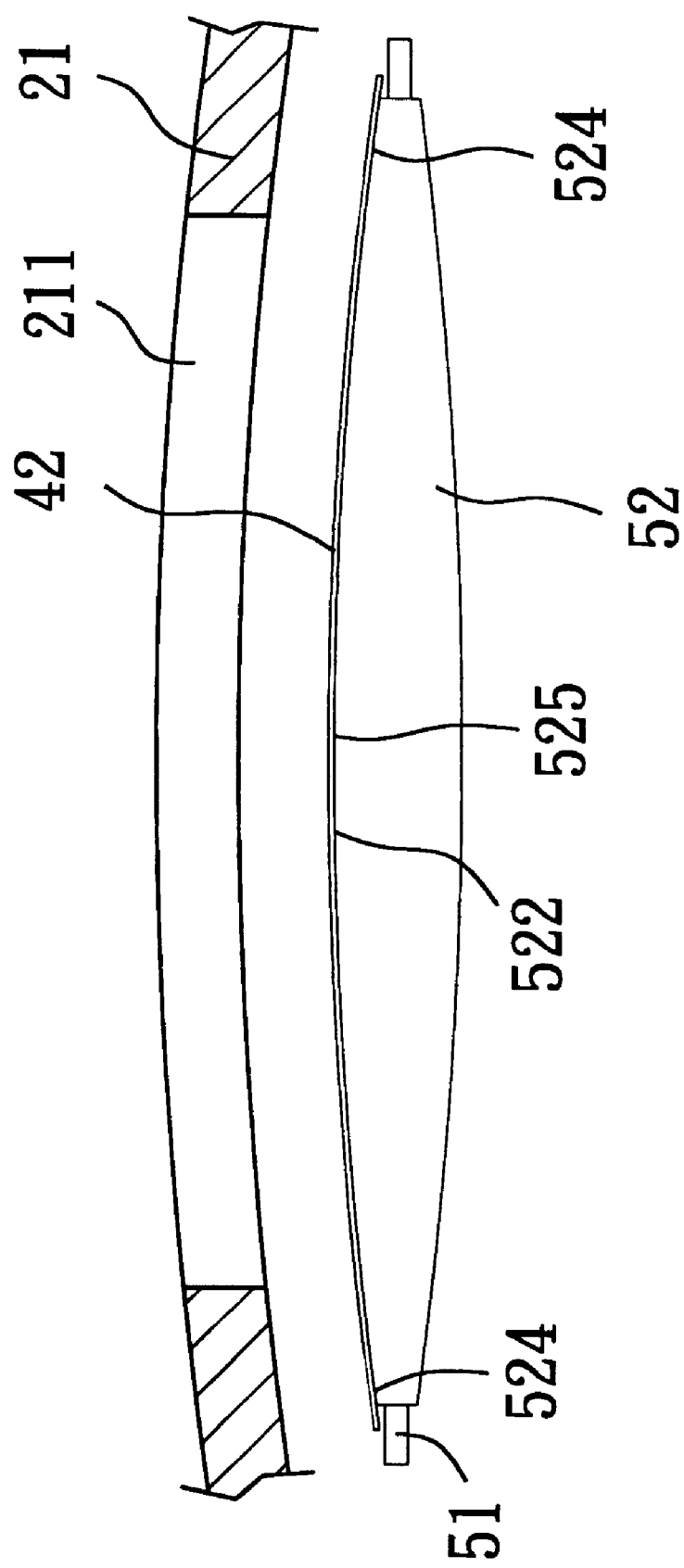
FIG. 4 is a schematic view illustrating how the screen guiding member supports the screen in the sunshade device of the first preferred embodiment.

Referring to FIGS. 2 and 3, the screen guiding member 5 is mounted in the housing 3 and is disposed between the rotary axle 41 and the slit 321. The screen guiding member 5 includes a mounting axle 51 parallel to the rotary shaft 41 and secured in the housing 3, and a guiding body 52 sleeved rotatably on the mounting axle 51. The guiding body 52 is a cigar-shaped cylindrical body with two tapered ends 524 which are opposite to each other along the longitudinal axis of the mounting axle 51, and a middle portion 525 wider than the tapered ends 524. The guiding body 52 has a convex outer wall surface 522 which extends in the direction of the mounting axle 51 and which extends among the tapered ends 524 and the central portion 525. The intermediate section 42 of the screen 4 extends over the guiding body 52, and is in contact with the convex outer wall surface 522 of the guiding body 52 during stretching of the screen 4 such that the screen 4 is curved and has a curvature conforming to that of the convex outer wall surface 522 when extended past the guiding body 42. The slit 321 formed in the front side wall 320 of the housing 3 has a curvature conforming to that of the convex outer wall surface 522 of the guiding body 52. As such, the part of the screen 4 that is stretched out of the housing 3 is curved, and has a curvature conforming to that of the convex outer wall surface 522 of the guiding body 52 and that of the slit 321.

Figure 5:
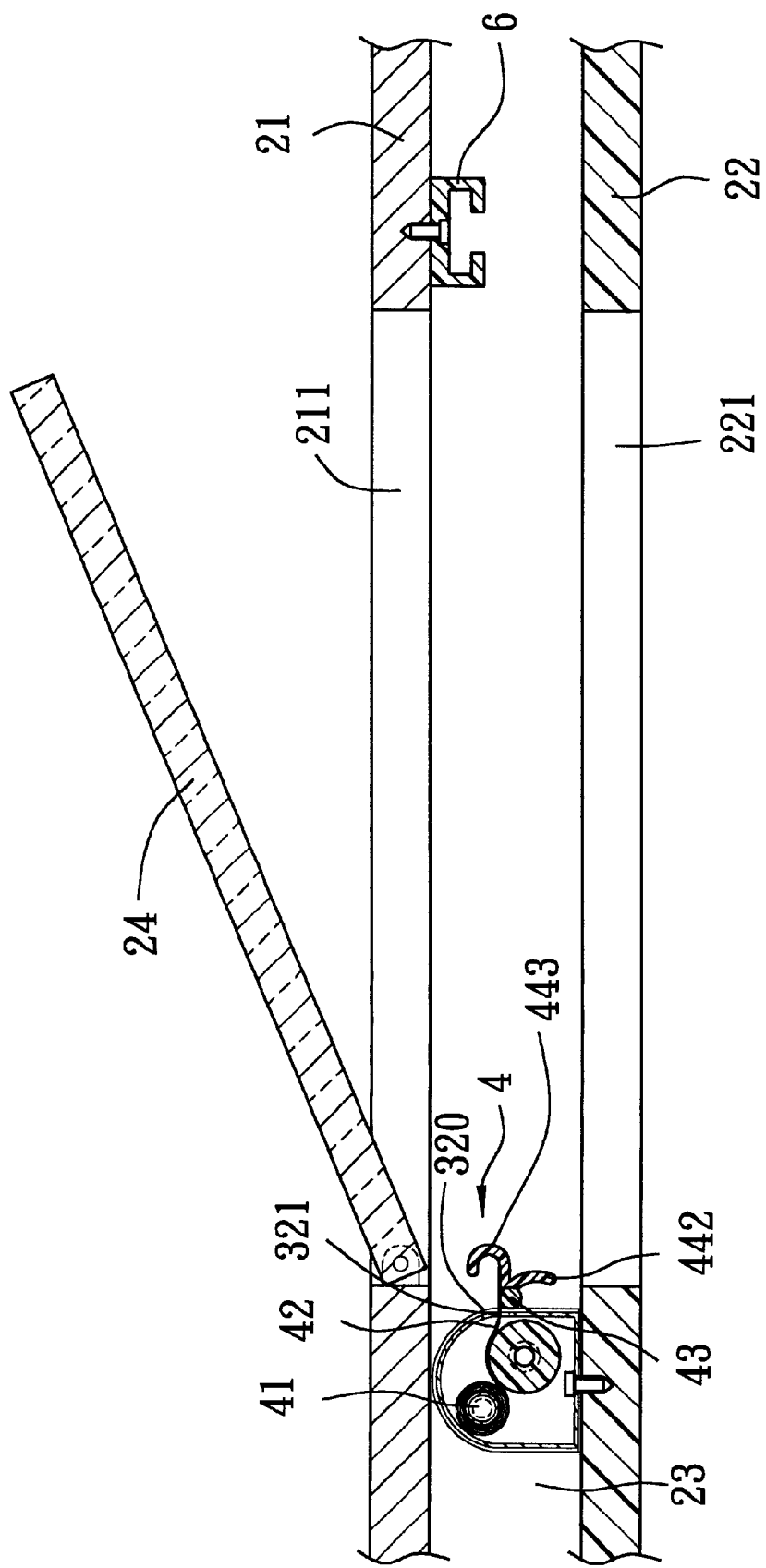
FIG. 5 is another sectional view of the first preferred embodiment, where the screen is shown to be in a retracted position.

In use, the gripping stud 442 is gripped by the user for pulling the screen 4 in a screen-stretching direction transverse to a longitudinal direction of the rotary shaft 41 against winding action of the rotary shaft 41 for moving the screen 4 to a stretched position shown in FIG. 2, in which the distal end 421 of the screen 4 is disposed away from the housing 3. By engaging the hook member 443 with the engaging groove 61 in the engaging member 6, the screen 4 can be retained at the stretched position. To retract the screen 4, the hook member 443 is disengaged from the engaging member 6 to permit retraction of the screen 4 toward the housing 3 due to biasing action of the biasing means, thereby moving the screen 4 to a retracted position shown in FIG. 5, in which the distal end 421 of the screen 4 is disposed adjacent to the slit 321 and in which the end strip 43 abuts against the front side wall 320 of the intermediate housing portion 32 of the housing 3.

Figure 6:
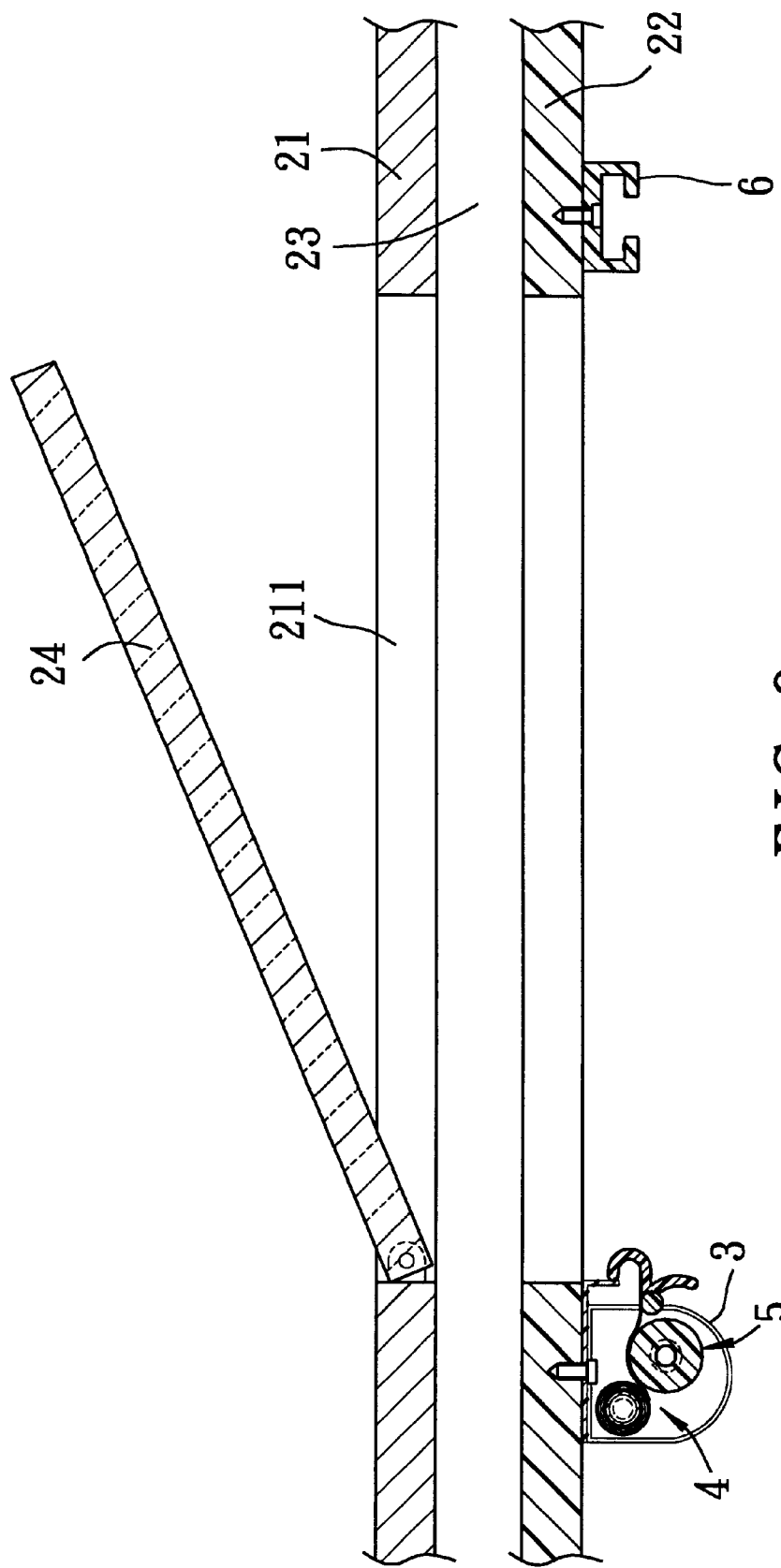
FIG. 6 is a sectional view of a second preferred embodiment.
Figure 7:
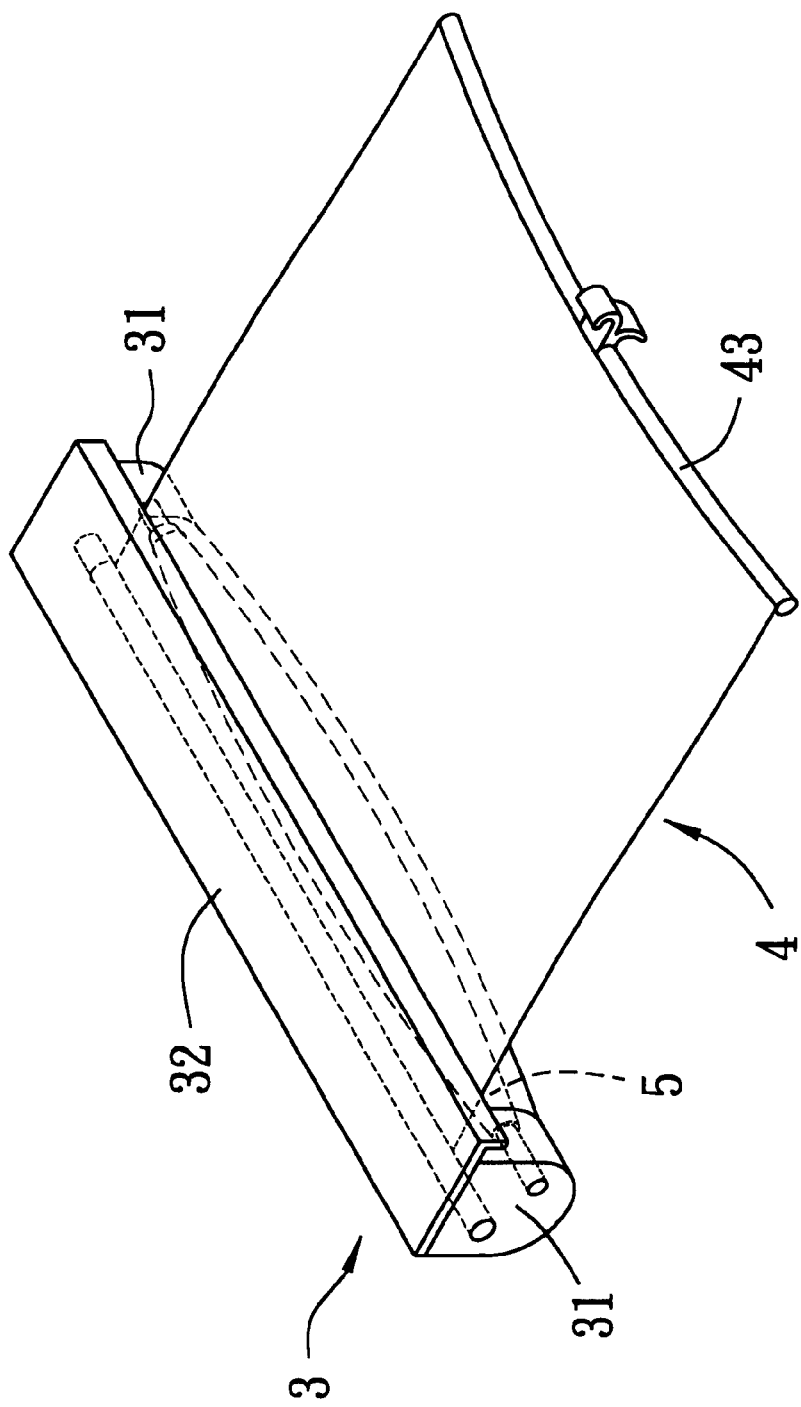
FIG. 7 is a perspective view of the second preferred embodiment.

In case the clearance 23 between the interior lining 22 and the exterior frame 21 of the automobile sunroof 2 is too narrow to permit installation of the sunshade device therein, the sunshade device may be attached to a bottom side of the interior lining adjacent to the window opening 211. Referring to FIGS. 6 and 7, the second preferred embodiment of the sunshade device of the present invention is installed and is attached to the bottom side of the interior lining 22 adjacent to the rear edges of the window openings 211, 221. The sunshade device of this embodiment is structurally identical to that of the previous embodiment, and will not be described further.

It has thus been shown that, with the provision of the screen guiding member 5 for guiding the screen 4, the screen 4 becomes curved when stretched from the housing 3 to conform to the curved automobile sunroof.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A sunshade device for an automobile with an interior lining, comprising:

an elongated housing for mounting on the interior lining and having longitudinally opposite end portions;

a rotary shaft journalled in said housing;

a screen wound around said rotary shaft and having a connecting end secured to said rotary shaft, a distal end opposite to said connecting end and extending out of said housing, and an intermediate section between said connecting end and said distal end, said screen being movable between a retracted position in which said distal end is disposed adjacent to said housing, and a stretched position in which said distal end is moved away from said housing;

an elongated screen guiding member mounted in said housing and having a longitudinal axis parallel to said rotary shaft, and a convex outer wall surface, said intermediate section of said screen extending along and being in contact with said convex outer wall surface of said screen guiding member such that said screen is curved and has a curvature conforming to that of said convex outer wall surface of said screen guiding member when extended past said screen guiding member;

wherein said screen guiding member includes a cigar-shaped guiding body with two tapered ends which are opposite to each other along the longitudinal axis of said screen guiding member, and a middle portion wider than said tapered ends, said convex outer wall surface being formed on said guiding body and extending in the direction along the longitudinal axis among said tapered ends and said middle portion; and a curved end strip mounted on said distal end of said screen and having a curvature conforming to that of said convex outer wall surface of said screen guiding member.

2. The sunshade device as claimed in claim 1, wherein said screen guiding member further includes a mounting axle parallel to said rotary shaft and secured in said housing, said guiding body being sleeved rotatably on said mounting axle.

3. A sunshade device for an automobile with an interior lining, comprising:

an elongated housing for mounting on the interior lining and having longitudinally opposite end portions;

a rotary shaft journalled in said housing;

a screen wound around said rotary shaft and having a connecting end secured to said rotary shaft, a distal end opposite to said connecting end and extending out of said housing, and an intermediate section between said connecting end and said distal end, said screen being movable between a retracted position in which said distal end is disposed adjacent to said housing, and a stretched position in which said distal end is moved away from said housing;

an elongated screen guiding member mounted in said housing and having a longitudinal axis parallel to said rotary shaft, and a convex outer wall surface, said intermediate section of said screen extending along and being in contact with said convex outer wall surface of said screen guiding member such that said screen is curved and has a curvature conforming to that of said convex outer wall surface of said screen guiding member when extended past said screen guiding member;

a curved end strip mounted on said distal end of said screen and having a curvature conforming to that of said convex outer wall surface of said screen guiding member; and wherein said housing is formed with a slit through which said distal end of said screen extends out of said housing, said elongated screen guiding member being disposed between said slit and said rotary shaft, said slit extending between said opposite end portions of said housing along a curved line which has a curvature conforming to that of said convex outer wall surface of said screen guiding member.

* * * * *